US008611905B2

(12) United States Patent
Zhu et al.

(10) Patent No.: US 8,611,905 B2
(45) Date of Patent: Dec. 17, 2013

(54) METHOD AND DEVICE FOR CONTROLLING THE COORDINATED TRANSMISSION FOR DOWNLINK SIGNALS IN A WIRELESS TELECOMMUNICATION NETWORK

(75) Inventors: Xiaolong Zhu, Shanghai (CN); Liyu Cai, Shanghai (CN); Keying Wu, Shanghai (CN); Hongwei Yang, Shanghai (CN)

(73) Assignee: Alcatel Lucent, Paris (FR)

( * ) Notice: Subject to any disclaimer, the term of this patent is extended or adjusted under 35 U.S.C. 154(b) by 97 days.

(21) Appl. No.: 12/936,696

(22) PCT Filed: Mar. 13, 2009

(86) PCT No.: PCT/CN2009/000269
§ 371 (c)(1),
(2), (4) Date: Oct. 7, 2010

(87) PCT Pub. No.: WO2009/124452
PCT Pub. Date: Oct. 15, 2009

(65) Prior Publication Data
US 2011/0028156 A1     Feb. 3, 2011

(30) Foreign Application Priority Data
Apr. 7, 2008  (CN) .......................... 2008 1 0035767

(51) Int. Cl.
*H04W 36/00* (2009.01)
(52) U.S. Cl.
USPC ......... 455/438; 455/450; 455/179.1; 370/334
(58) Field of Classification Search
USPC ......... 455/438, 450, 179.1; 370/334; 375/148
See application file for complete search history.

(56) References Cited

U.S. PATENT DOCUMENTS

| 8,095,097 B1* | 1/2012 | Nabar et al. ................ 455/179.1 |
| 8,229,017 B1* | 7/2012 | Lee et al. ....................... 375/267 |
| 8,315,223 B2* | 11/2012 | Tsutsui ......................... 370/330 |
| 2006/0120477 A1 | 6/2006 | Shen et al. |
| 2007/0174038 A1* | 7/2007 | Wang et al. ....................... 704/1 |
| 2007/0248172 A1 | 10/2007 | Mehta et al. |
| 2009/0213909 A1* | 8/2009 | Grant et al. ................... 375/148 |

FOREIGN PATENT DOCUMENTS

| CN | 428946 A | 7/2003 |
| CN | 101034926 A | 9/2007 |
| WO | WO2007123029 A1 | 11/2007 |
| WO | WO 2008/003022 | 1/2008 |

OTHER PUBLICATIONS

Supplementary European Search Report.
Yang Song, et al., "Collaborative Mimo," IEEE Broadband Wireless Access Working Group, Nov. 7, 2007, pp. 1-9.
International Search Report for PCT/CN2009/000269.

* cited by examiner

*Primary Examiner* — Danh Le
(74) *Attorney, Agent, or Firm* — Fay Sharpe, LLP

(57) ABSTRACT

A method and device for controlling the serving BS and at least one coordinating BS for coordinating downlink data communication with the MS in a wireless telecommunication network based on CO-MIMO technology. The method comprises obtaining the MIMO downlink channel information between the serving BS and the MS and between the coordinating BS and the MS, determining the downlink signal precoding information between the serving BS and the MS and between the coordinating BS and the MS according to the channel information, and performing MIMO downlink data communication coordinately with the MS based on the downlink signal precoding information.

10 Claims, 5 Drawing Sheets

US 8,611,905 B2

METHOD AND DEVICE FOR CONTROLLING THE COORDINATED TRANSMISSION FOR DOWNLINK SIGNALS IN A WIRELESS TELECOMMUNICATION NETWORK

TECHNICAL FIELDS

The invention relates to a wireless telecommunication network, and particularly relates to a wireless telecommunication network based on multiple BSs collaborative MIMO technology.

BACKGROUND OF THE INVENTION

In a wireless telecommunication network, MIMO (multiple-input multiple-output) technology improves the communication ability due to the use of multiple antennas at both the wireless sender and receiver. In the MIMO technology, the more mature SU-MIMO (Single User multiple-input multiple-output) enables the time-frequency resources of the BS (Base Station) to an one-to-one correspondence with that of the MS (Mobile Station), and the BS communicates with single MS at a specific time-frequency resource via multiple antennas; therefore, the communication ability between the BS and the single MS are greatly improved. However, with the increment of the number of the MSs, the situation that multiple MSs share common time-frequency resources for communication should be considered; therefore, Multiple-User MIMO (MU-MIMO) obtains wide attention and study. In MU-MIMO, the BS communicates with multiple different MSs at the same time-frequency resource simultaneously via multiple antennas; therefore, the communication ability among the BS and multiple MSs can be improved simultaneously.

In the existing SU-MIMO and MU-MIMO, most studies are limited to the situation that the BS uses its own antennas to communicate with single MS or mu MSs. However, in a wireless Mesh network or wireless self-organized network, if the MIMO communication of the MS can He performed simultaneously and coordinately by the BS of its own cell and other neighbouring BSs with good communication quality, then the communication ability of the MS can be improved compared with single BS service. Therefore, the multiple-BS collaborative MIMO(CO-MIMO) has received a lot of attention. To be specific, multiple-BS CO-MIMO uses multiple antennas of the serving BS and the coordinating BS with different geographic locations, to coordinately perform MIMO communication with the MS.

In multiple-BS CO-MIMO, it is a necessary step of determining precoding information according to the channel information between the serving BS and the MS, and between the coordinating BS and the MS. In Time Division Duplex (TDD) mode where the channel reciprocity between the downlink and the uplink holds, the serving BS and coordinating BS can obtain the uplink channel responses between the serving BS and the MS, and between the coordinating BS and the MS according to the uplink from the MS, and calculate the downlink channel information between the serving BS and the MS, and between the coordinating BS and the MS respectively, and each corresponding downlink precoding matrix, according to the uplink channel response. However, in frequency-division duplex (FDD) mode, because the frequency difference between downlink and uplink carrier usually exceeds the channel coherent bandwidth, the downlink channel fading is almost uncorrelated with the uplink one in most cases, which results that the serving and coordinating BSs can not determine their respective downlink channel information according to uplink channel fading. Further, the serving BS and toe coordinating BS can not determine their corresponding downlink precoding matrix, therefore, the CO-MIMO downlink data communication with the MS can not be implemented. There is no method for effectively solving this problem in the prior art.

SUMMARY OF THE INVENTION

In order to solve the above-mentioned defects, the present invention proposes a method and device in a wireless telecommunication network based on CO-MIMO technology for controlling the serving BS to coordinate with at least one coordinating BS for downlink data communication with a MS. The serving BS sends a measurement instruction to the MS, wherein the measurement instruction comprises aiding determining information for determining channel related information of each downlink channel between the serving BS and the MS, and between the at least one coordinating BS and the MS. The MS receives the measurement instruction from the serving BS, and determines the channel related information of each downlink channel between the serving BS and the MS and between the at least one coordinating BS and the MS based on the aiding determining information therein, and generates feedback information for the measurement instruction according to the determined channel related information and sends the feedback information for the measurement instruction to the serving BS. The serving BS receives feedback information for the measurement instruction from the MS, and obtains downlink signal precoding information between the serving BS and the MS, and at least on downlink signal precoding information between the at least one coordinating BS and the MS, according to the feedback information for the measurement instruction, and then, the serving BS sends at least one coordinating request message corresponding to the at least one coordinating BS to the at least one coordinating BS, wherein the coordinating request message comprises downlink signal precoding information between the corresponding coordinating BS and the MS. The coordinating BS receives the coordinating request message from the serving BS, wherein the coordinating request message comprises downlink signal precoding information between the coordinating BS and the MS. At last, the serving BS and the at least one coordinating BS transmit coordinately downlink signals preceded according to the downlink signal precoding information to the MS, and the MS receives the downlink signals preceded according to the downlink signal precoding information transmitted coordinately by the serving BS and the at least one coordinating BS, and the CO-MIMO communication procedure begins.

According to a first aspect of the present invention, there is provided a method in a serving BS in a CO-MIMO based wireless telecommunication network of controlling the serving BS to coordinate with at least one coordinating BS for downlink data communication with a MS, comprising: a. sending a measurement instruction to the MS, wherein the measurement instruction comprises aiding determining information for determining channel related information of each downlink channel between the serving BS and the MS, and between the at least one coordinating BS and the MS; b. receiving feedback information for the measurement instruction from the MS; c. obtaining downlink signal precoding information between the serving BS and the MS, and at least one downlink signal precoding information between the at least one coordinating BS and the MS, according to the feedback information for the measurement instruction; d. sending at least one coordinating request message corresponding to the at least one coordinating BS to the at least one coordinating BS, wherein the coordinating request message comprises downlink signal precoding information between the corresponding coordinating BS and the MS; g. transmitting, coordinately with the at least one coordinating BS, downlink signals precoded according to the downlink signal precoding information to the MS.

According to a second aspect of the present invention, there provided a method in a coordinating BS in a CO-MIMO based telecommunication network of controlling the coordinating BS to coordinate with a serving BS for downlink data communication with a MS, comprising: i. receiving a coordinating request message from the serving BS, wherein the coordinating request message comprises downlink signal precoding information between the coordinating BS and the MS; iv. transmitting, coordinately with the serving BS, downlink signals precoded according to the downlink signal precoding information to the MS.

According to a third aspect of the present invention, there is provided a method in a MS in a CO-MIMO based telecommunication network of aiding controlling a serving BS and at least one coordinating BS to coordinately perform downlink data communication with the MS, comprising: I. receiving a measurement instruction from the serving BS, wherein the measurement instruction comprises aiding determining information for determining channel related information of each downlink channel between the serving BS and the MS, and between the at least one coordinating BS and the MS; II. determining channel, related, information of each downlink channel between the serving BS and the MS and between time at least one coordinating BS and the MS based on the aiding determining information; III. generating feedback information for the measurement instruction according to the determined channel related information of each downlink channel between the serving BS and the MS and between the at least one coordinating BS and the MS; IV. sending the feedback information for the measurement instruction to the serving BS; VI. receiving downlink signals precoded according to the downlink signal precoding information transmitted coordinately by the serving BS and the at least one coordinating BS.

According to a fourth aspect of the present invention, there is provided a method in a serving BS in a CO-MIMO based wireless telecommunication network of controlling the serving BS to coordinate with at least one coordinating BS for downlink data communication with a MS, comprising: A. sending a measurement instruction to the MS, wherein the measurement instruction comprises aiding determining information for determining channel related information of each downlink channel between the serving BS and the MS, and between the at least one coordinating BS and the MS; B. receiving downlink signal precoding information between the serving BS and the MS from the MS; C. transmitting, coordinately with the at least one coordinating BS, downlink signals precoded according to the downlink signal precoding information to the MS.

According to a fifth aspect of the present invention, there is provided a method in a coordinating BS in a CO-MIMO based telecommunication network of controlling the coordinating BS to coordinate with a serving BS for downlink data communication with a MS, comprising: M. receiving downlink signal precoding information between the coordinating BS and the MS from the MS; N. transmitting, coordinately with the serving BS, downlink signals preceded according to the downlink signal precoding information to the MS.

According to a sixth aspect of the present invention, there is to provided a method in a MS in a CO-MIMO based telecommunication network of aiding controlling a serving BS and at least one coordinating BC to coordinately perform downlink data communication with the MS, comprising: m. receiving a measurement instruction from the serving BS, wherein the measurement instruction comprises aiding determining information for determining channel related information of each downlink channel between the serving BS and the MS, and between the at least one coordinating BS and the MS; n. determining channel related information of each downlink channel between the serving BS and the MS, and between the at least one coordinating BS and the MS based on the aiding determining information; o. determining downlink signal precoding information between the serving BS and the MS and at least one downlink signal precoding information between the at least one coordinating BS and the MS based on a predetermined rule, according to the determined channel related information of each downlink signal between the serving BS and the MS and between the at least one coordinating BS and the MS; p. sending the downlink signal precoding information between the serving BS and the MS to the serving BS, and the at least one downlink signal precoding information between the at least one coordinating BS and the MS to the corresponding coordinated BS respectively; q. receiving down link signals precoded according to the downlink signal precoding information transmitted coordinately by the serving BS and the at least one coordinating BS.

According to a seventh aspect of the present invention, there is provided a first controlling device in a serving BS in a CO-MIMO based wireless telecommunication network for controlling the serving BS to coordinate with at least one coordinating BS for downlink data communication with a MS, comprising:

a first sender, for sending a measurement instruction to the MS, wherein the measurement instruction comprises aiding determining information for determining channel related information of each downlink channel between the serving BS and the MS, and between the at least one coordinating BS and the MS; a first receiver, for receiving feedback information for the measurement instruction from the MS; a first obtaining means, for obtaining downlink signal precoding information between the serving BS and the MS, and at least one downlink signal precoding information between the at least one coordinating BS and the MS, according to the feedback information for the measurement instruction; a second sender, for sending at least one coordinating request message corresponding to the at least one coordinating BS to the at least one coordinating BS, wherein the coordinating request message comprises downlink signal precoding information between the corresponding coordinating BS and the MS; a first transmitter, for transmitting, coordinately with the at least one coordinating BS, downlink signals precoded according to the downlink signal precoding information to the MS.

According to an eighth aspect of the present invention, there is provided a first coordinating controlling device in a coordinating BS in a CO-MIMO based telecommunication network for controlling the coordinating BS to coordinate with a serving BS for downlink data communication with a MS, comprising:

a third receiver, for receiving a coordinating request message from the serving BS, wherein the coordinating request message comprises downlink signal precoding information between the coordinating BS and the MS; a second transmitter, for transmitting, coordinately with the serving BS, downlink signals precoded according to the downlink signal precoding information to the MS.

According to a ninth aspect of the present invention, there is provided a first aiding controlling device in a MS in a CO-MIMO based telecommunication network for aiding controlling a serving BS and at least one coordinating BS to coordinately perform downlink data communication with the MS, comprising:

a fifth receiver, for receiving a measurement instruction from the serving BS, wherein the measurement instruction comprises aiding determining information for determining channel related information of each downlink channel between the serving BS and the MS, and between the at least one coordinating BS and the MS; a fifth determining means, for determining channel related information of each downlink channel between the serving BS and the MS and between the at least one coordinating BS and the MS based on the aiding determining information; a third generator, for generating feedback information for the measurement instruction according to the determined channel related information each downlink channel between the serving BS and the MS and between the at least one coordinating BS and the MS;

a fifth sender, for sending the feedback information for the measurement instruction to the serving BS;

a sixth receiver, for receiving downlink signals precoded according to the downlink signal precoding information transmitted coordinately by the serving and the at least one coordinating BS.

According to a tenth aspect of the present invention, there is provided a second controlling device in a serving BS in a CO-MIMO based wireless telecommunication network for controlling the serving BS to coordinate with at least one coordinating BS for downlink data communication with a MS, comprising:

a sixth sender, for sending a measurement instruction to the MS, wherein the measurement instruction comprises aiding determining information for determining channel related information of each downlink channel between the serving BS and the MS, and between the at least one coordinating BS and the MS; an eighth receiver, for receiving downlink signal precoding information between the serving BS and the MS from the MS; a third transmitter, for transmitting, coordinately with the at least one coordinating BS, downlink signals precoded according to the downlink signal precoding information to the MS.

According to an eleventh aspect of the present invention, there is provided a second coordinating controlling device in a coordinating BS in a CO-MIMO based telecommunication network for controlling the coordinating BS to coordinate with a serving BS for downlink data communication with a MS, comprising:

a ninth receiver, for receiving downlink signal precoding information between the coordinating BS and the MS from the MS;

a fourth transmitter, for transmitting, coordinately with the serving BS, downlink signals precoded according to the downlink signal precoding information to the MS.

According to a twelfth aspect of the present invention, there is provided a second aiding controlling device in a MS in a CO-MIMO based telecommunication network for aiding controlling a serving BS and at least one coordinating BS to coordinately perform downlink data communication with the MS, comprising:

a tenth receiver, for receiving a measurement instruction from the serving BS, wherein the measurement instruction comprises aiding determining information for determining channel related information of each downlink channel between the serving BS and the MS, and between the at least one coordinating BS and the MS; a seventh determining means, for determining channel related information of each downlink channel between the serving BS and the MS, and between the at least one coordinating BS and the MS based on the aiding determining information; an eighth determining means, for determining downlink signal precoding information between the serving BS and the MS and at least one downlink signal precoding information between the at least one coordinating BS and the MS based on a predetermined rule, according to the determined channel related information of each downlink signal between the serving BS and the MS and between the at least one coordinating BS and the MS; a seventh sender, for sending the downlink signal precoding information between the serving BS and the MS to the serving BS, and the at least one downlink signal precoding information between the at least one coordinating BS and the MS to the corresponding coordinated BS respectively; eleventh receiver, for receiving downlink signals precoded according to the downlink signal precoding information transmitted coordinately by the serving BS and the at least one coordinating BS.

Compared with the SU-MIMO and MU-MIMO based on single BS in the prior art, the multiple-BS CO-MIMO technology proposed by the present invention obtains the MIMO downlink channel information between the serving BS and the MS and between the coordinating BS and the MS, and then determines the downlink signal precoding information between the serving BS and the MS and between the coordinating BS and the MS, and performs coordinated downlink data communication with the MS according to the downlink precoding information. The technical solution of the present invention takes fully advantage of the plurality different antennas and wireless channel resource of the serving BS and the coordinating BS, and performs MIMO communication with the MS based on suitable precoding, which is applicable to both the communication mode of downlink and uplink symmetry such as TDD etc., and the communication mode of downlink and uplink asymmetry such as FDD etc, with relatively less signaling and feedback overhead, enlarges the cell coverage to some extent and the communication ability of the cell edge user and reduces the inter-cell interference with relatively small backhaul information bandwidth, improves the function of the existing SU-MIMO and MU-MIMO based on single BS, and makes little changes to the existing technology and network, which is easy for standardization.

BRIEF DESCRIPTION OF THE DRAWINGS

Other features, aspects and advantages of the present invention will become obvious by reading the following description of several non-limiting embodiments with the aid of appended drawings.

DETAILED DESCRIPTION OF THE EMBODIMENTS

Figure 1:
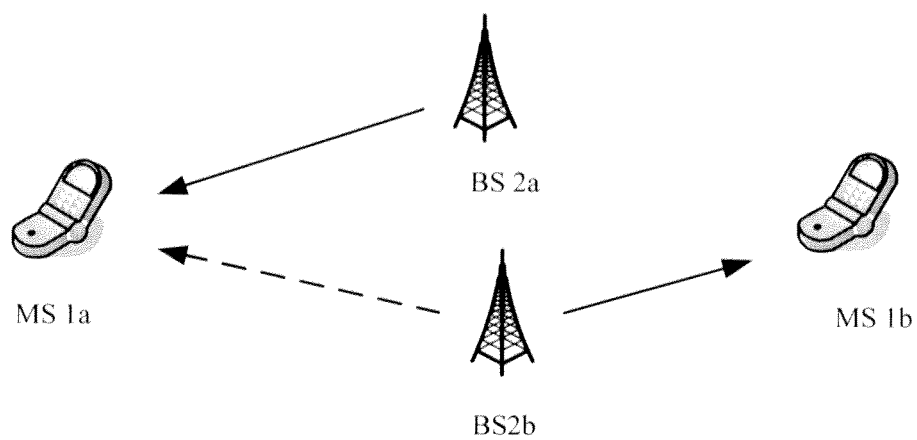
FIG. 1 illustrates a network diagram of wireless telecommunication network with multiple-BS CO-MIMO technology according to the present invention.

Reference will now be made to the drawings for the detailed description of the present invention:

FIG. 1 show a network diagram of a wireless telecommunication network with multiple-RS CO-MIMO technology according to the present invention.

The wireless telecommunication network shown in FIG. 1 comprises a MS 1a, a MS 1b, a BS 2a and a BS 2b. Without loss of generality, it is assumed that both the MS 1a and the MS 1b have two receiving antennas, and both the BS 2a and the BS 2b have two transmitting antennas. Those skilled in the art can understand that, in a specific application scenario, the MS 1a of the wireless telecommunication network may comprise more than two receiving antennas, and the MS 1b may comprise at least one receiving antenna, and BS 2a and BS 2b may comprise more than two transmitting antennas.

Figure 2:
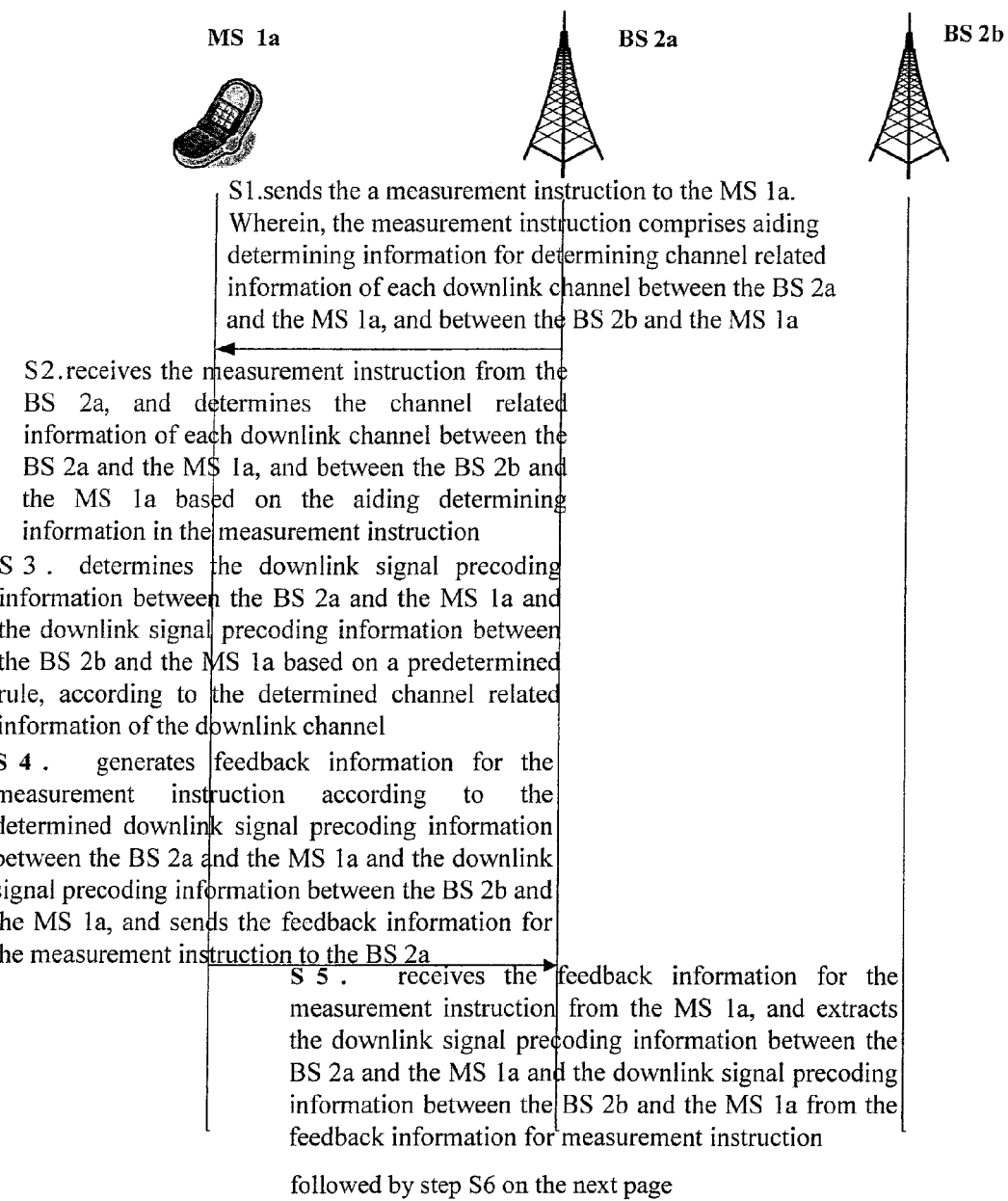
FIG. 2 illustrates a systematic flowchart of a serving BS and a coordinating BS in a wireless telecommunication network based on multiple-BS CO-MIMO technology coordinately performing downlink data communication with the MS according to an embodiment of the present invention.
Figure 2:
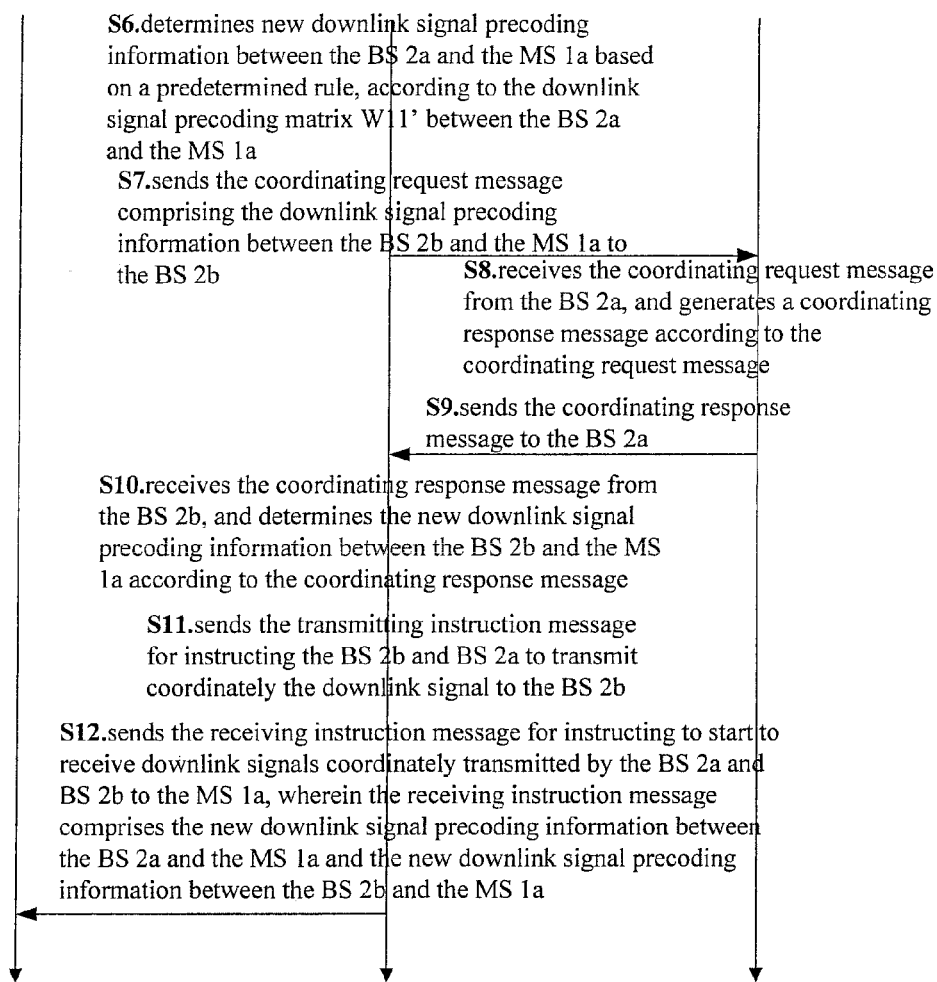

FIG. 2 illustrates a systematic flowchart of a serving BS and a coordinating BS in a wireless telecommunication network with multiple-BS CO-MIMO technology coordinately performing downlink data communication with the MS according to an embodiment of the present invention.

The technical solution of the present invention will be given in details referring to FIG. 2 in combination with FIG. 1. To be specific, the MS 1a first determines its serving BS based on preamble or other measurement. If the strength of the preamble or other signals that the MS 1a receives from the BS 2a is larger than that received from other BSs, then the MS 1a determines that the BS 2a is its serving BS, that is, the MS 1a is dominated by the BS 2a.

Similarly, the MS 1b determines its serving BS based on preamble or ether measurement. If the strength of the preamble or other signals that the MS 1b receives from the BS 2b is larger than that received from other BSs, then the MS 1b determines that the BS 2b is its serving BS, that is, the MS 1b is dominated by the BS 2b.

Take the situation that the MS 1a is dominated by the BS 2a, the MS 1b is dominated by the BS 2b, the MS 1a or BS 2a sends request to BS 2a to request the BS 2b and BS 2a to coordinate for the downlink data transmission with MS 1a as an example for illustration:

First, the BS 2a sends a measurement instruction message to the MS 1a to inform the MS 1a of performing measurement based on preambles or common pilots and reporting the measurement result to the BS 1a.

After the MS 1a receives the measurement instruction message from the BS 2a, it measures the strength of the preambles or common pilots received from the BS 2a and BS 2b according to the measurement instruction message, and reports the measurement results to the BS 2a.

Further, the MS 1a may measure the strength of the preambles or common pilots from the BS 2a and the BS 2b periodically, and reports the measurement results periodically to the BS 2a.

Alternatively, the MS 1a may inform the BS 2a of the measurement result when a predetermined condition is satisfied. The predetermined condition may comprise: the MS 1a determines that it is located at the cell edge according to the measurement result (the received signal strength indicator (RSSI) or physical carrier-to-interference-plus-noise power ratio (PCINR) between the BS 2a and the MS 1a is below a predefined threshold, or the difference between the received signal strength indicator (RSSI) or physical carrier-to-interference-plus-noise power ratio (PCINR) between the BS 2a and the MS 1a and that between the BS 2b and NIS 1a is lower than another predetermined threshold. The BS 2a determines that the MS 1a basically satisfies the CO-MIMO condition according to the received measurement result (for example, the MS 1a is located at the edge of the cell that BS 2a dominates), then, the method enters step S1, the BS 2a sends a measurement instruction to the MS 1a, wherein, the measurement instruction comprises aiding determining information for determining flannel related information of each downlink channel between the BS 2a and the MS 1a, and between the BS 2b and the MS 1a.

Further, the aiding determining information comprises the time-frequency resource for measuring the common pilot signals from the BS 2a and the BS 2b (i.e. what time-frequency resource that the BS 2a and BS 2b should use for measuring common pilot signals) and other necessary information for estimating the downlink channel between the BS 2a and the MS 1a and the downlink channel between the BS 2b and the MS 1a.

Alternatively, the measurement instruction further comprises the precoding granularity, the calculation strategy of the precoding information and the feedback strategy of the precoding information, etc.

Further, the precoding granularity defines the size of time-frequency resource block that a same precoding matrix is applicable to.

Further, the calculation strategy of the precoding information may comprise long-term precoding (such as the channel covariance matrix based precoding) and short-term precoding (such as the channel instantaneous information based precoding).

Further, the feedback strategy of the precoding information may comprise feedback the precoding information only to the BS 2a or feedback the precoding information simultaneously to both BS 2a and BS 2b, and the starting time point and time interval of the feedback (i.e., how often does the MS 1a feedback the precoding information to the corresponding BS), etc.

Of course, for the calculation strategy of the precoding information, feedback strategy of the precoding information and the precoding granularity, they can be mutually communicated by handshaking information when the MS 1a enters into the network. Based on that, in step S1, the measurement instruction that the BS 2a sends to MS 1a may not comprise these information. Then, the method enters step S2, the MS 1a receives the measurement instruction from the BS 2a, and determines the channel related information of each downlink channel between the BS 2a and the MS 1a, and between the BS 2b and the MS 1a based on the aiding determining information in the measurement instruction.

Further, the MS 1a estimates the channel related information H11 of the downlink channel between the BS 2a and the MS 1a and the channel related information H12 of the downlink channel between the BS 2b and the MS 1a respectively via the common pilot signal received from the BS 2a and the common pilot signal received from the BS 2b, based on the aiding determining information in the measurement instruction, wherein, both H11 and H12 are 2×2 matrices.

Still further, the amount of rows of the matrix H11 equals the amount of receiving antennas of the MS 1a, and the amount of columns of the matrix H11 equals the amount of transmitting antennas of the BS 2a. The amount of rows of the matrix H12 equals the amount of receiving antennas of the MS 1a, and the amount of columns of the matrix H12 equals the amount of transmitting antennas of the BS 2b.

Then, the method enters step S3, the MS 1a determines the downlink signal precoding information between the BS 2a and the MS 1a and the downlink signal precoding information between the BS 2b and the MS 1a based on a predetermined rule, according to the determined channel related information H11 and H12 of the downlink channel.

Further, the calculation method for the downlink signal precoding information can be divided into two categories: long term precoding and short term precoding.

A. Long Term Precoding

The channel covariance matrix based long term precoding is taken as an example to describe the method of determining the downlink signal precoding information between the BS 2a and the MS 1a and the downlink signal precoding information between the BS 2b and the MS 1a.

The MS 1a first estimates the covariance matrix R=E{[H11 H12]*×[H11 H12]}, where E{ } is the expectation operator, and the superscript * is the conjugate transpose operator.

Then, the MS 1a determines the optimal precoding matrices W11' and W12' by the following criteria:

$$W11, \quad W12 = \max_{W11, W12 \in Codebook} \text{Trace}\left\{\begin{bmatrix} W11 & O \\ O & W12 \end{bmatrix}^* R \begin{bmatrix} W11 & O \\ O & W12 \end{bmatrix}\right\} \quad (1)$$

wherein "O" represents a null matrix of the sane amount of rows and columns as that of W11 and W12, Trace{ } equals the sum of on-diagonal elements of the enclosed matrix.

Wherein, W11 and W12 are elements of the predetermined codebook. Further, the predetermined codebook shared by the MS 1a, the MS 1b, the BS 2a and the BS 2b. Still further, the codebook may he a DFT codebook, a 3GPP LTE codebook, IEEE802.16e codebook or other cod book, which can he understood by those skilled in the art and will not be elaborated here.

Wherein, the optimal precoding matrix W11' represents the downlink signal precoding matrix between the BS 2a and the MS 1a, and the optimal precoding matrix W12' represents the downlink signal precoding matrix between the BS 2b and the MS 1a.

B. Short Term Precoding

The channel instantaneous information based short-term precoding is taken as an example to describe the method of determining the downlink signal precoding information between the BS 2a and the MS 1a and the downlink signal precoding information between the BS 2b and the MS 1a.

The MS1a determines the optimal precoding matrices W11' and W12' by the following criteria:

$$W11, \quad W12 = \max_{W11, W12 \in Codebook} \text{Capacity}\left\{[H11 \ H12]\begin{bmatrix} W11 & O \\ O & W12 \end{bmatrix}\right\} \quad (2)$$

wherein "O" represents a null matrix of the same amount of rows and columns as that of W11 and W12, Capacity{ } represents the channel capacity.

Wherein, the optimal precoding matrix W11' represents the downlink signal precoding matrix between the BS 2a and the MS 1a, and the optimal precoding matrix W12' represents the downlink signal precoding matrix between the BS 2b and the MS 1a.

Then, the method enters step S4, the MS 1a generates feedback information for the measurement instruction according to the determined downlink signal precoding information between the BS 2a and the MS 1a and the downlink signal precoding information between the BS 2b and the MS 1a, and sends the feedback information for the measurement instruction to the BS 2a.

To be specific, after the MS la determines the optimal precoding matrices W11' and W12' by searching the codebook, it sends the indices of the optimal precoding matrices W11' and W12' to the BS 2a as the feedback information for the measurement instruction. Of course, the MS 1a may send the optimal precoding matrices W11' and W12' as the feedback information for the measurement instruction directly to the BS 2a.

Optionally, the feedback information for the measurement instruction may further comprise indication information besides the indices of the optimal precoding matrices W11' and W12' or the optimal precoding matrices W11' and W12' themselves, and the MS 1a uses this indication information to inform the BS 2a whether it is suitable for CO-MIMO transmission. For example, the indication information may comprise the capacity gain using Co-MIMO over SU-MIMO, or simply a binary value, wherein "1" represents it is suitable for Co-MIMO transmission while "0" represents it is not suitable for CO-MIMO transmission.

Then, in step S5, the BS 2a receives the feedback information for the measurement instruction from the MS 1a, and extracts the downlink signal precoding information between the BS 2a and the MS 1a and the downlink signal precoding information between the BS 2b and the MS 1a from the if information for measurement instruction.

To be specific, if the MS 1a sends the indices of the optimal precoding matrices W11' and W12' as the feedback information for the measurement instruction to the BS 2a, then, the BS 2a first needs to extract the indices of the optimal precoding matrices W11' and W12' from the feedback information for the measurement instruction, and searches the optimal precoding matrices W11' and W12' in the codebook shared with the MS 1a according to the indices.

If the MS 1a sends the optimal precoding matrices W11' and W12' directly to the BS 2a as the feedback information for the measurement instruction, then, the BS 2a only needs to extract the optimal precoding matrices W11' and W12' from the feedback information for the measurement instruction.

After the BS 2a obtains the downlink signal precoding matrix W11' between the BS 2a and the MS 1a, in step S6, the BS 2a determines new downlink signal precoding information between the BS 2a and the MS 1a based on a predetermined rule, according to the downlink signal precoding matrix W11' between the BS 2a and the MS 1a. To be specific, after the BS 2a obtains the downlink signal precoding matrix W11' between the BS 2a and the MS 1a, if the BS 2a thinks that the downlink signal precoding matrix is suitable, then the BS 2a accepts the downlink signal precoding matrix W11'. The BS 2a may not consider the downlink signal precoding matrix recommended by the MS 1a, and search again for another downlink signal precoding matrix in the shared codebook. Further, the searched again downlink signal precoding matrix should have strong correlation with the downlink signal precoding matrix originally recommended by the MS 1*a* and have reduced impairment to her users dominated by the BS 2*a*.

Of course, if the BS 2*a* thinks that it is not suitable for performing CO-MIMO transmission with the BS 2*b* (for example, CO-MIMO transmission of BS 2*a* and BS 2*b* will incur interference to other MSs served by the BS 2*a*), then the BS 2*a* may reject to serve the MS 1*a* in a CO-MIMO transmission manner with the BS 2*b*.

The BS 2*a* determines the new downlink signal precoding information (the new downlink signal precoding information may be the downlink signal precoding information determined by the MS 1*a*, or the downlink signal precoding information re-determined by the BS 2*a*) according to its final chosen result (accepting the downlink signal precoding information recommended by the MS 1*a*, re-determining downlink signal precoding information, or rejecting the CO-MIMO transmission with the BS 2*b*), which is used to inform the MS 1*a*.

If the BS 2*a* accepts the downlink signal precoding matrix W11' defaulted after it obtains the downlink signal precoding matrix between the BS 2*a* and the MS 1*a*, then, the step S6 can be omitted. Then, the method enters step S7, the BS 2*a* sends the coordinating request message comprising the downlink signal precoding information between the BS 2*b* and the MS 1*a* to the BS 2*b*.

To be specific, the BS 2*a* may send the index of the downlink signal precoding matrix W12' between the BS 2*b* and the MS 1*a* via the coordinating request message to the BS 2*b*. Of course, the BS 2*a* may send the downlink signal precoding matrix W12' directly via the coordinating request message to the BS 2*b*.

Optionally, the coordinating request message tray further comprise the time-frequency resource information that the BS 2*a* allocates for the MS 1*a*, so as to inform the BS 2*b* of using the same time-frequency resource for the CO-MIMO transmission. with the BS 2*a*, and the coordinating request message may further comprise the precoding strategy information (for example, the application of long-term precoding or short-term precoding, the precoding granularity, etc).

It should be noted that, there is no order between the step S6 and S7.

Then, the method enters step S8, the BS 2*b* receives the coordinating request message from the BS 2*a*, and generates a coordinating response message according to the coordinating request message.

To be specific, if the BS 2*a* sends the index of the downlink signal precoding matrix W12' via the coordinating request message to the BS 2*b*, then, after the BS 2*b* receives the coordinating request message from the BS 2*a*, the BS 2*b* first extracts the index of the downlink signal precoding matrix W12' from the coordinating request message, and then, searches for the corresponding downlink signal precoding matrix W12' in the shared codebook according to the index.

If the BS 2*a* sends the downlink signal precoding matrix W12' directly via the coordinating request message to the BS 2*b*, then the BS 2*b* only needs to extract the downlink signal precoding matrix W12' from the coordinating request message.

Further, after the BS 2*b* obtains the downlink signal precoding matrix W12' between the BS 2*b* and the MS 1*a*, if the BS 2*b* thinks that the downlink signal precoding matrix is suitable, then the BS 2*b* accepts the downlink signal precoding matrix W12'.

The BS 2*b* may not consider the downlink signal precoding matrix from the BS 2*a*, and search again for another downlink signal precoding matrix in the shared codebook. Further, the searched again downlink signal precoding matrix should have strong correlation with the downlink signal precoding matrix originally from the BS 2*a* and have reduced impairment to other users dominated by the BS 2*b*.

Of course, if the BS 2*a* thinks that it is not sui table for performing CO-MIMO transmission with the BS 2*a* for example, CO-MIMO transmission of BS 2*a* and BS 2*b* will incur interference to other NISs served by the BS 2*b*), then the BS 2*b* may reject the CO-MIMO transmission with the BS 2*a*.

Whether the BS 2*b* accepts the downlink signal precoding matrix from the BS 2*a*, or searches again a downlink signal precoding matrix from the shared codebook, or rejects the CO-MIMO transmission with the BS 2*a*, the BS 2*b* informs the BS 2*a* of its chosen result via the coordinating response message.

If the BS 2*b* accepts the downlink signal precoding matrix W12' in the coordinating request message defaulted after it obtains the coordinating request message from the BS 2*a*, then the step S8 can be omitted.

Then, in step S9, the BS 2*b* sends the coordinating response message to the BS 2*a*.

Then, in step S10, the BS 2*a* receives the coordinating response message from the BS 2*b*, and determines the new downlink signal precoding information between the BS 2*b* and the MS 1*a* according to the coordinating response message.

To be specific, The BS 2*a* extracts the chosen result of the BS 2*b* (accepting the original downlink signal precoding matrix, or re-determining a downlink signal precoding matrix, or rejecting the CO-MIMO transmission with the BS 2*a*) from the coordinating response message, and determines the new downlink signal precoding information between the BS 1*b* and the MS 1*a* (the new downlink signal precoding information may be the original downlink signal precoding information determined by the MS 1*a*, or the downlink signal precoding information re-determined by the BS 2*b*) according to the chosen result, which is used to inform the MS 1*a*.

It should be noted that on the basis that step S8 is omitted, the subsequent step S9, S10 may both be omitted.

Then, the method enters S11, the BS 2*a* sends the transmitting instruction message for instructing the BS 2*b* and BS 2*a* to transmit coordinately the downlink signal to the BS 2*b*.

Further, the transmitting instruction message is used to inform the BS 2*b* of the time-frequency resource that the BS 2*b* is needed for the CO-MIMO transmission with the BS 2*a*.

Of course, when the time-frequency resource is agreed on in advance, the step S11 may be omitted.

At last, in step S12, the BS 2*a* sends the receiving instruction message for instructing to start to receive downlink signals coordinately transmitted by the BS 2*a* and BS 2*b* to the MS 1*a*, wherein the receiving instruction message comprises the new downlink signal precoding information between the BS 2*a* and the MS 1*a* and the new downlink signal precoding information between the BS 2*b* and the MS 1*a*.

Of course, if the BS 2*a* and the BS 2*b* both accept the downlink signal precoding matrix determined by the MS 1*a*, then, the receiving instruction message may not comprise the new downlink signal precoding information between the BS 2*a* and the MS 1*a* and the new downlink signal precoding information between the BS 2*b* and the MS 1*a*.

After the MS 1*a* receives the downlink transmitting signal precoded by the downlink signal precoding information W11' from the BS 2*a* and the downlink transmitting signal precoded by the downlink signal precoding information W12' from the BS 2*b*, it restores the signal from the BS 2*a* according to the obtained channel related information H11 of the downlink channel between the BS 2a and the MS 1a and the downlink signal precoding information W11'. Meanwhile, it restores the signal from the BS 2b according to the obtained channel related information H12 of the downlink channel between the BS 2b and the MS 1a and the downlink signal precoding information W12'.

In a variation, after the MS 1a determines the channel related information H11 of the downlink channel between the BS 2a and the MS 1a and the channel related information H12 of the downlink channel between the BS 2b and the MS 1a, it directly sends the channel related information to the BS 2a, and the BS 2a determines the downlink signal precoding information between the BS 2a and the MS 1a and the downlink signal precoding information between the BS 2b and the MS 1a based on the predetermined rule, according to the received channel related information H11 and H12. The detailed method of determining may refer to the description about the step S3, and will not be elaborated for simplicity.

Of course, after the BS 2a determines the downlink signal precoding information between the BS 2a and the MS 1a and the downlink signal precoding information between the BS 2b and the MS 1a, it also needs to inform the determined downlink signal precoding information to the MS 1a.

In another variation, after the MS 1a determines the downlink signal precoding information between the BS 2a and the MS 1a and the downlink signal precoding information between the BS 2b and the MS 1a, it sends the downlink signal precoding information between the BS 2a and the MS 1a to the BS 2a, while sends the downlink signal precoding information between the BS 2b and the MS 1a to the BS 2b. After the BS 2a and the BS 2b receive the downlink signal precoding information from the MS 1a, they may accept the precoding information, or re-determine a downlink signal precoding information. Of course, they may reject CO-MIMO transmission between each other. If the BS 2a and the BS 2b re-determine their downlink signal precoding information respectively, then the BS 2a and the BS 2b must inform the MS 1a of their re-determined downlink signal precoding information.

Figure 3:
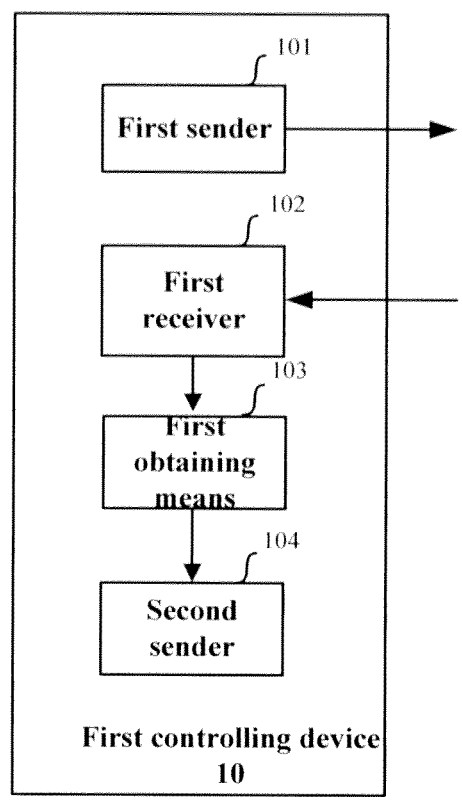
FIG. 3 illustrates a structural diagram of a first controlling device in the serving BS in a wireless telecommunication network based on CO-MIMO technology for controlling itself to coordinate with at least one coordinating BS for downlink data communication with the MS according to an embodiment of the present invention.
Figure 4:
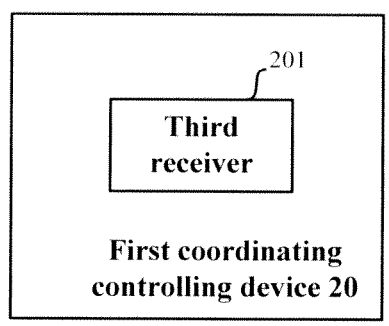
FIG. 4 illustrates the structural diagram of a first coordinating controlling device in the coordinating BS in a wireless telecommunication network based on CO-MIMO technology for controlling itself to coordinate with the serving BS for downlink data communication with the MS according to an embodiment of the present invention.
Figure 5:
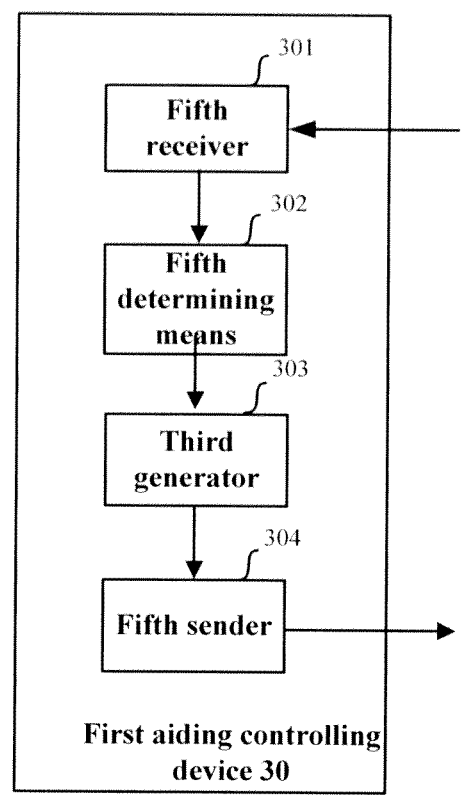
FIG. 5 illustrates the structural diagram of a first aiding controlling device in the MS in a wireless telecommunication network based on CO-MIMO technology for aiding controlling the serving BS and the at least one coordinating BS to coordinately perform downlink data communication with the MS according to another embodiment of the present invention Wherein, same or similar reference numerals refer to the same or similar components.

Reference will be made to FIGS. 3,4 and 5 in combination with FIG. 1 for the detailed description of the technical solution of the present invention.

FIG. 3 illustrates a structural diagram of a first controlling device in the serving BS in a wireless telecommunication network based on CO-MIMO technology for controlling itself to coordinate with at least one coordinating BS for downlink data communication with the MS according to an embodiment of the present invention. Wherein, the first controlling device 10 comprises a first sender 101, a first receiver 102, a first obtaining means 103 and a second sender 104.

FIG. 4 illustrates the structural diagram of a first coordinating controlling device in the coordinating BS in a wireless telecommunication network based on CO-MIMO technology for controlling itself to coordinate with the serving BS for downlink data communication with the MS according to an embodiment of the present invention. Wherein, the first coordinating controlling device 20 comprises a third receiver 201.

FIG. 5 illustrates the structural diagram of a first aiding controlling device in the MS in a wireless telecommunication network based on CO-MIMO technology for aiding controlling the serving BS and the at least one coordinating BS to coordinately perform downlink data communication with the MS according to another embodiment of the present invention. Wherein, the first aiding controlling device 30 comprises a fifth receiver 301, a fifth determining means 302, a third generator 303 and a fifth sender 304.

To be specific, the MS 1a first determines its serving BS based on preamble or other measurement. If the strength of the preamble or other signals that the MS 1a receives from the BS 2a is larger than that received from other BSs, then the MS 1a determines that the BS 2a is its serving BS, that is, the MS 1a is dominated by the BS 2a.

Similarly, the MS 1b determines its serving BS based on preamble or other measurement. If the strength of the preamble or other signals that the MS 1b receives from the BS 2b is larger than that received from other BSs, then the MS 1b determines that the BS 2b is its serving BS, that is, the MS 1b is dominated by the BS 2b.

Take the situation that the MS 1a is dominated by the BS 2a, the MS 1b is dominated by the BS 2b, the MS 1a or BS 2a sends request to BS 2a to request the BS 2b and BS 2a to coordinate for the downlink data transmission with MS 1a as an example for illustration:

First, the BS 2a sends a measurement instruction message to the MS 1a to inform the MS 1a of performing measurement based on preambles or common pilots and reporting the measurement result to the BS 2a.

After the MS 1a receives the measurement instruction message from the BS 2a, it measures the strength of the preambles or common pilots received from the BS 2a and BS 2b according to the measurement instruction message, and reports the measurement results to the BS 2a.

Further, the MS 1a may measure the strength of the preambles or common pilots from the BS 2a and the BS 2b periodically, and reports the measurement results periodically to the BS 2a.

Alternatively, the MS 1a may inform the BS 2a of the measurement result when a predetermined condition is satisfied. The predetermined condition may comprise: the MS 1a determines that it is located at the cell edge according to the measurement result (the received signal strength indicator (RSSI) or physical carrier-to-interference-plus-noise power ratio (PCINR) between the BS 2a and the MS 1a is below a predefined threshold, or the difference between the received signal strength indicator (RSSI) or physical carrier-to-interference-plus-noise power ratio (PCINR) between the BS 2a and the MS 1a and that between the BS 2b and MS 1a is lower than another predetermined threshold. The BS 2a determines that the MS 1a basically satisfies the CO-MIMO condition according to the received measurement result (for example, the MS 1a is located at the edge of the cell that BS 2a dominates), then, the first sender 101 in the first controller 10 of the BS 2a sends a measurement instruction to the MS 1a, wherein, the measurement instruction comprises aiding determining information for determining channel related information of each downlink channel between the BS 2a and the MS 1a, and between the BS 2b and the MS 1a.

Further, the aiding determining information comprises the time-frequency resource for measuring the common pilot signals from the BS 2a and the BS 2b (i.e. what time-frequency resource that the BS 2a and BS 2b should use for measuring common pilot signals) and other necessary information for estimating the downlink channel between the BS 2a and the MS 1a and the downlink channel between the BS 2b and the MS 1a.

Alternatively, the measurement instruction further comprises the precoding granularity, the calculation strategy of the precoding information and the feedback strategy of the precoding information, etc.

Further, the precoding granularity defines the size of the time-frequency resource block that a same precoding matrix is applicable to.

Further, the calculation strategy of the precoding information may comprise long-term precoding (such as the channel covariance matrix based precoding) and short-term precoding (such as the channel instantaneous information based precoding).

Further, the feedback strategy of the precoding information may comprise feedback the precoding information only to the BS 2a or feedback the precoding information simultaneously to both BS 2a and BS 2b, and the starting time point and time interval of the feedback (i.e., how often does the MS 1a feedback the precoding information to the or BS), etc.

Of course, for the calculation strategy of the precoding information, feedback strategy of the precoding information and the precoding granularity, they can be mutually communicated by handshaking information when the MS 1a enters into the network. Based on that, the measurement instruction that the BS 2a sends to MS 1a may not comprise these information.

Then, the fifth receiver 301 in the first aiding controlling (device 30 contained in the MS 1a receives the measurement instruction from the BS 2a, and the fifth determining means 302 in the first aiding controlling device 30 determines the channel related information of each downlink channel between the BS 2a and the MS 1a, and between the BS 2b and the MS 1a based on the aiding determining information in the measurement instruction. Further, the fifth determining means 302 estimates the channel related information H11 of the downlink channel between the BS 2a and the MS 1a and the channel related information H12 of the downlink channel between the BS 2b and the MS 1a respectively via the common pilot signal received from the BS 2a and the common pilot signal received from the BS 2b, based on the aiding determining information in the measurement instruction, wherein, both H11 and H12 are 2×2 matrices.

Still further, the amount of rows of the matrix H11 equals the amount of receiving antennas of the MS 1a, and the amount of columns of the matrix H11 equals the amount of transmitting antennas of the BS 2a. The amount of rows of the matrix H12 equals the amount of receiving antennas of the MS 1a, and the amount of columns of the matrix H12 equals the amount of transmitting antennas of the BS 2b.

Then, the sixth determining means (not shown in FIG. 5 for simply) in the third generator 303 contained in the first aiding controlling device 30 determines the downlink signal precoding information between the BS 2a and the MS 1a and the downlink signal precoding information between the BS 2b and the MS 1a based on a predetermined rule, according to the determined channel related information H11 and H12 of the downlink channel. Further, the calculation method for the downlink signal precoding information can be divided into two categories: long term precoding and short term precoding.

A. Long Term Precoding

The channel covariance matrix based long term precoding is taken as an example to describe the method of determining the downlink signal precoding information between the BS 2a and the MS 1a and the downlink signal precoding information between the BS 2b and the MS 1a.

The sixth determining means first estimates the covariance matrix R=E{[H11 H12]*×[H11 H12]}, where E{ } is the expectation operator, and the superscript * is the conjugate transpose operator.

Then, the sixth determining means determines the optimal precoding matrices W11' and W12' by the following criteria:

$$W12 = \max_{W11, W12 \in Codebook} \text{Trace} \left\{ \begin{bmatrix} W11 & O \\ O & W12 \end{bmatrix}^* R \begin{bmatrix} W11 & O \\ O & W12 \end{bmatrix} \right\} \quad (1)$$

wherein "O" represents a null matrix of the same amount of rows and columns as that of W11 and W12, Trace{ } equals the sum of on-diagonal elements of the enclosed matrix.

Wherein, W11 and W12 are elements of the predetermined codebook. Further, the predetermined codebook is shared by the MS 1a, the MS 1b, the BS 2a and the BS 2b. Still further, the codebook may be a DFT codebook, a 3GPP LTE codebook, IEEE802.16e codebook or other codebook, which can be understood by those skilled in the art and will not be elaborated hero.

Wherein, the optimal precoding matrix W11' represents the downlink signal precoding matrix between the BS 2a and the MS 1a, and the optimal precoding matrix W12' represents the down link signal precoding matrix between the BS 2b and the MS 1a.

B. Short Term Precoding

The channel instantaneous information based short-term precoding is taken as an example to describe the method of determining the downlink signal precoding information between the BS 2a and the MS 1a and the downlink signal precoding information between the BS 2b and the MS 1a.

The sixth determining means determines the optimal precoding matrices W11' and W12' by the following criteria:

$$W11, W12 = \max_{W11, W12 \in Codebook} \text{Capacity} \left\{ [H11\ H12] \begin{bmatrix} W11 & O \\ O & W12 \end{bmatrix} \right\} \quad (2)$$

wherein "O" represents a null matrix of the same amount of rows and columns as that of W11 and W12, Capacity{ } represents the channel capacity.

Wherein, the optimal precoding matrix W11' represents the downlink signal precoding matrix between the BS 2a and the MS 1a, and the optimal precoding matrix W12' represents the downlink signal precoding matrix between the BS 2b and the MS 1a.

Then, the fourth generator(not shown in FIG. 5 for simplicity) in the third generator 303 generates feedback information for the measurement instruction according to the determined downlink signal precoding information between the BS 2a and the MS 1a and the downlink signal precoding information between the BS 2b and the MS 1a, and the fifth sender 304 in the first aiding controlling device 30 sends the feedback information for the measurement instruction to the BS 2a.

To be specific, after the sixth determining means determines the optimal precoding matrices W11' and W12' by searching the codebook, the fifth sender 304 sends the indices of the optimal precoding matrices W11' and W12' to the BS 2a as the feedback information for the measurement instruction.

Of course, the fifth sender 304 may send the optimal precoding matrices W11' and W12' as the feedback information for the measurement instruction directly to the BS 2a.

Optionally, the feedback information for the measurement instruction may further comprise indication information besides the indices of the optimal precoding matrices W11' and W12' or the optimal precoding matrices W11' and W12' themselves, and the MS 1a uses this indication information to inform the BS 2a whether it is suitable for CO-MIMO transmission. For example, the indication information may comprise the capacity gain using Co-MIMO over SU-MIMO, or simply a binary value, wherein "1" represents it is suitable for Co-MIMO transmission while "0" represents it is not suitable for CO-MIMO transmission.

Then, the first receiver 102 in the first controlling device 10 receives the feedback information for the measurement instruction from the MS 1a, and the first extracting means (not shown in FIG. 3 for simplicity) in the first obtaining means 103 in the first controlling device 10 extracts the downlink signal precoding information between the BS 2a and the MS 1a and the downlink signal precoding information between the BS 2b and the MS 1a from the feedback information for measurement instruction.

To be specific, if the MS 1a sends the indices of the optimal precoding matrices W11' and W12' as the feedback information for the measurement instruction to the BS 2a, then, the first extracting means first needs to extract the indices of the optimal precoding matrices W11' and W12' from the feedback information for the measurement instruction, and searches the optimal precoding matrices W11' and W12' in the codebook shared with the MS 1a according to the indices.

If the MS 1a sends the optimal precoding matrices W11' and W12' directly to the BS 2a as the feedback information for the measurement instruction, then, the first extracting means only needs to extract the optimal precoding matrices W11' and W12' from the feedback information for the measurement instruction. After the BS 2a obtains the downlink signal precoding matrix W11' between the BS 2a and the MS 1a, the second determining means (not shown in FIG. 3 for simplicity) in the first controlling device 10 determines new downlink signal precoding information between the BS 2a and the MS 1a based on a predetermined rule, according to the downlink signal precoding matrix W11' between the BS 2a and the MS 1a.

To be specific, after the BS 2a obtains the downlink signal precoding matrix W11' between the BS 2a and the MS 1a, if the BS 2a thinks that the downlink signal precoding matrix is suitable, then the BS 2a accepts the downlink signal precoding matrix W11'. The BS 2a may not consider the downlink signal precoding matrix recommended by the MS 1a, and search again for another downlink signal precoding matrix in the shared codebook. Further, the searched again downlink signal precoding matrix should have strong correlation with the downlink signal precoding matrix originally recommended by the MS 1a and have reduced impairment to other users dominated by the BS 2a.

Of course, if the BS 2a that it is not suitable for performing CO-MIMO transmission with the BS 2b (for example, CO-MIMO transmission of BS 2a and BS 2b will incur interference to other MSs served by the BS 2a), then the BS 2a may reject to serve the MS 1a in a CO-MIMO transmission manner with the BS 2b.

The second determining means in the first controlling device 10 determines the new downlink signal precoding information (the new downlink signal precoding information may be the downlink signal precoding information determined by the MS 1a, or the downlink signal precoding information re-determined by the BS 2a) according to its final chosen result (accepting the downlink signal precoding information recommended by the MS 1a, re-determining downlink signal precoding information, or rejecting the CO-MIMO transmission with the BS 2b), which is used to inform the MS 1a.

It the BS 2a accepts the downlink signal precoding matrix W11' defaulted after it obtains the downlink signal precoding matrix between the BS 2a and the MS 1a, then, the second determining means can be omitted.

Then, the second sender 104 in the first controlling device 10 sends the coordinating request message comprising the downlink signal precoding information between the BS 2b and the MS 1a to the BS 2b.

To be specific, the second sender 104 may send the index of the downlink signal precoding matrix W12' between the BS 2b and the MS 1a via the coordinating request message to the BS 2b. Of course, the second sender 104 may send the downlink signal precoding matrix W12' directly via the coordinating request message to the BS 2b.

Optionally, the coordinating request message nay further comprise the time-frequency resource information that the BS 2a allocates for the MS 1a, so as to inform the BS 2b of using the same time-frequency resource for the CO-MIMO transmission with the BS 2a, and the coordinating request message may further comprise the precoding strategy information (for example, the application of long-term precoding or short-term precoding, the precoding granularity, etc).

Then, the third receiver 201 in the first coordinating controlling device 20 receives the coordinating request message from the BS 2a, and a first generator (not shown in FIG. 4 for simplicity) in the first coordinating controlling device 20 generates a coordinating response message according to the coordinating request message.

To be specific, if the BS 2a sends the index of the downlink signal precoding matrix W12' via the coordinating request message to the BS 2b, then, after the third receiver 201 receives the coordinating request message from the BS 2a, the third extracting means (not shown in FIG. 4 for simplicity) in the first generator first extracts the index of the downlink signal precoding matrix W12' from the coordinating request message, and then, searches for the corresponding downlink signal precoding matrix W12' in the shared codebook according to the index.

If the BS 2a sends the downlink signal precoding matrix W12' directly via the coordinating request message to the BS 2b, then the third extracting means in the first generator only needs to extract the downlink signal precoding matrix W12' from the coordinating request message.

Further, it the BS 2b obtains the downlink signal precoding matrix W12' between the BS 2b and the MS 1a, it the BS 2b thinks that the downlink signal precoding matrix is suitable, then the BS 2b accepts the downlink signal precoding matrix W12'.

The BS 2b may not consider the downlink signal precoding matrix from the BS 2a, and search again for another downlink signal precoding matrix in the shared codebook. Further, the searched again downlink signal precoding matrix should have strong correlation with the downlink signal precoding matrix originally from the BS 2a and have reduced impairment to other users dominated by the BS 2b.

Of course, if the BS 2a thinks that it is not suitable for performing CO-MIMO transmission with the BS 2a (for example, CO-MIMO transmission of BS 2a and BS 2b will incur interference to other MSs served by the BS 2b), then the BS 2b may reject the CC-MIMO transmission with the BS 2a.

Whether the BS 2b accepts the downlink signal precoding matrix from the BS 2a, or searches again a downlink signal precoding matrix from the shared codebook, or rejects the CO-MIMO transmission with the BS 2a, the BS 2b informs the BS 2a of its chosen result via the coordinating response message.

If the BS 2b accepts the downlink signal precoding matrix W12' in the coordinating request message defaulted after it obtains the coordinating request message from the BS 2a, then the above first generator can be omitted.

Then, the fourth sender in the first coordinating controlling device 20 sends the coordinating response message to the BS 2a.

Then, the second receiver (not shown in FIG. 3 for simplicity) in the first controlling device 10 receives the coordinating response message from the BS 2b, and the first determining means (not shown in FIG. 1 for simplicity) in the first controlling device 10 determines the new downlink signal precoding information between the BS 2b and the MS 1a according to the coordinating response message.

To be specific, the first determining means in the first controlling device 10 extracts the chosen result of the BS 2b (accepting the original downlink signal precoding matrix, or re-determining a downlink signal precoding matrix, or rejecting the CO-MIMO transmission with the BS 2a) from the coordinating response message, and determines the new downlink signal precoding information between the BS 1b and the MS 1a (the new downlink signal precoding information may be the original downlink signal precoding information determined by the MS 1a, or the downlink signal precoding information re-determined by the BS 2b) according to the chosen result, which is used to inform the MS 1a.

It should be noted that on the basis that the first generator is omitted, the fourth sender, the second receiver and the first determining means may all be omitted.

Then, the third sender (not shown in FIG. 3 for simplicity) in the first controlling device 10 sends the transmitting instruction message for instructing the BS 2b and BS 2a to transmit coordinately the downlink signal to the BS 2b.

Further, the transmitting instruction message is used to inform the BS 2b of the time-frequency resource that the BS 2b is needed for the CO-MIMO transmission with the BS 2a.

Of course, when the time-frequency resource is agreed on in advance the third sender may be omitted.

At last, the third sender in the first controlling device 10 sends the receiving instruction message for instructing to start to receive downlink signals coordinately transmitted by the BS 2a and BS 2b to the MS 1a, wherein the receiving instruction message comprises the new downlink signal precoding information between the BS 2a and the MS 1a and the new downlink signal precoding information between the BS 2b and the MS 1a.

Of course, if the BS 1a and the BS 1b both accept the down link signal precoding matrix determined by the MS 1a, then, the receiving instruction message may net comprise the new downlink signal precoding information between the BS 2a and the MS 1a and the new downlink signal precoding information between the BS 2b and the MS 1a.

After the MS 1a receives the downlink transmitting signal precoded by the downlink signal precoding information W11' from the BS 2a and the downlink transmitting signal precoded by the downlink signal precoding information W12' from the BS 2b, it restores the signal from the BS 2a according to the obtained channel related information H11 of the downlink channel between the BS 2a and the MS 1a and the downlink signal precoding information W11'. Meanwhile, it restores the signal from the BS 2b according to the obtained channel related information H12 of the downlink channel between the BS 2b and the MS 1a and the downlink signal precoding information W12'.

In a variation, after the fifth determining means 302 in the first aiding controlling device 30 determines the channel related information H11 of the downlink channel between the BS 2a and the MS 1a and the channel related information H12 of the downlink channel between the BS 2b and the MS 1a, it directly sends the channel related information to the BS 2a, and the first obtaining means 103 in the first controlling device 10 determines the downlink signal precoding information between the BS 2a and the MS 1a and the (downlink signal precoding information between the BS 2b and the MS 1a based on the predetermined rule, according to the received channel related information P11 and P12.

Of course, after the BS 2a (determines the downlink signal precoding information between the BS 2a and the MS 1a and the downlink signal precoding information between the BS 2b and the MS 1a, it also needs to inform the determined downlink signal precoding information to the MS 1a.

In another variation, after the eighth determining means in the second aiding controlling device contained in the MS 1a determines the (downlink signal precoding information between the BS 2a and the MS 1a and the downlink signal precoding information between the BS 2b and the MS 1a, the seventh sender in the second aiding controlling device sends the downlink signal precoding information between the BS 2a and the MS 1a to the BS 2a, while sends the downlink signal precoding information between the BS 2b and the MS 1a to the BS 2b. After the eighth receiver in the second controlling device contained in the BS 2a and the ninth receiver in the second coordinating controlling device contained in the BS 2b receive the downlink signal precoding information from the MS 1a, they may accept the precoding information, or re-determine a downlink signal precoding information. Of course, they may reject CO-MIMO transmission between each other. If the BS 2a and the BS 2b re-determine their downlink signal precoding information respectively, then the BS 2a and the BS 2b must inform the MS 1a of their re-determined downlink signal precoding information.

The description of detailed embodiment of the present invention is given above. It should be understood that the present invention is not limited to the above specific embodiment, those skilled in the art may make variation and modifications in the scope of the appended claims.

What is claimed is:

1. In a serving BS of a collaborative multiple-input multiple-output based wireless telecommunication network, a method of controlling the serving BS to coordinate with at least one coordinating BS for downlink data communication with a MS, the method comprising:

sending a measurement instruction to the MS, wherein the measurement instruction comprises determining information based upon which channel related information is determined for each downlink channel between the serving BS and the MS, and between the at least one coordinating BS and the MS;

receiving feedback information from the MS in response to the measurement instruction;

obtaining downlink signal precoding information between the serving BS and the MS, and at least one downlink signal precoding information between the at least one coordinating BS and the MS based upon the feedback information;

sending at least one coordinating request message to the at least one coordinating BS, wherein the coordinating request message comprises the obtained downlink signal precoding information between the coordinating BS and the MS; and transmitting, coordinately with the at least one coordinating BS, downlink signals precoded according to the downlink signal precoding information to the MS.

2. The method according to claim 1, wherein after the sending of the at least one coordinating request message and before said transmitting, the method further comprises:

sending a receiving instruction message for instructing to start to receive coordinately transmitted downlink signals to the MS, and sending at least one transmitting instruction message for instructing the at least one coordinating BS to coordinately transmit downlink signals to the corresponding coordinating BS.

3. The method according to claim 2, wherein after the sending of the at least one coordinating request message and before said transmitting, the method further comprises:
receiving at least one coordinating response message from the at least one coordinating BS; and
determining at least one new downlink signal precoding information between the at least one coordinating BS and the MS according to the at least one coordinating response message;
wherein, the receiving instruction message comprises the determined at least one new downlink signal precoding information between the at least one coordinating BS and the MS.

4. The method according to claim 2, wherein after said obtaining and before sending of the at least one coordinating request message, the method further comprises:
determining new downlink signal precoding information between the serving BS and the MS based on a predetermined rule, according to downlink signal precoding information between the serving BS and the MS;
wherein, the receiving instruction message comprises the determined new downlink signal precoding information between the serving BS and the MS.

5. In a MS of a collaborative multiple-input multiple-output based telecommunication network, a method for aiding in controlling a serving BS and at least one coordinating BS to coordinately perform downlink data communication with the MS, said method comprising:
receiving a measurement instruction from the serving BS, wherein the measurement instruction comprises determining information for aiding in determining channel related information for each downlink channel between the serving BS and the MS, and between the at least one coordinating BS and the MS;
determining, based on the determining information, channel related information for each downlink channel between the serving BS and the MS and between the at least one coordinating BS and the MS;
generating feedback information in response to the measurement instruction according to the determined channel related information for each downlink channel between the serving BS and the MS and between the at least one coordinating BS and the MS;
sending the feedback information to the serving BS; and
receiving downlink signals precoded according to the downlink signal precoding information transmitted coordinately by the serving BS and the at least one coordinating BS.

6. The method according to claim 5, wherein after said sending of the feedback information and before said receiving of the downlink signals, the method further comprises:
receiving a receiving instruction message for instructing the MS to start to receive coordinately transmitted downlink signal from the serving BS.

7. In a serving BS of a collaborative multiple-input multiple-output based wireless telecommunication network, a method of controlling the serving BS to coordinate with at least one coordinating BS for downlink data communication with a MS, said method comprising:
sending a measurement instruction to the MS, wherein the measurement instruction comprises determining information used to aid in determining channel related information for each downlink channel between the serving BS and the MS, and between the at least one coordinating BS and the MS;
receiving, from the MS, downlink signal precoding information between the serving BS and the MS; and
transmitting to the MS, coordinately with the at least one coordinating BS, downlink signals precoded according to the downlink signal precoding information.

8. In a MS of a collaborative multiple-input multiple-output based telecommunication network, a method of aiding controlling a serving BS and at least one coordinating BS to coordinately perform downlink data communication with the MS, said method comprising:
receiving a measurement instruction from the serving BS, wherein the measurement instruction comprises determining information for aiding in determining channel related information for each downlink channel between the serving BS and the MS, and between the at least one coordinating BS and the MS;
determining, based on the determining information, channel related information for each downlink channel between the serving BS and the MS, and between the at least one coordinating BS and the MS;
determining downlink signal precoding information between the serving BS and the MS and at least one downlink signal precoding information between the at least one coordinating BS and the MS based on a predetermined rule, according to the determined channel related information of each downlink signal between the serving BS and the MS and between the at least one coordinating BS and the MS;
sending the downlink signal precoding information between the serving BS and the MS to the serving BS, and the at least one downlink signal precoding information between the at least one coordinating BS and the MS to the corresponding coordinated BS respectively; and
receiving downlink signals precoded according to the downlink signal precoding information transmitted coordinately by the serving BS and the at least one coordinating BS.

9. A controlling device in a serving BS of a collaborative multiple-input multiple-output based wireless telecommunication network that controls the serving BS to coordinate with at least one coordinating BS for downlink data communication with a MS, the controlling device comprising:
a first sender that sends a measurement instruction to the MS, wherein the measurement instruction comprises determining information used to aid in determining channel related information of each downlink channel between the serving BS and the MS, and between the at least one coordinating BS and the MS;
a receiver that receives from the MS feedback information in response to the measurement instruction;
an obtaining device that obtains downlink signal precoding information between the serving BS and the MS, and at least one downlink signal precoding information between the at least one coordinating BS and the MS, according to the feedback information;
a second sender that sends at least one coordinating request message corresponding to the at least one coordinating BS to the at least one coordinating BS, wherein the coordinating request message comprises downlink signal precoding information between the corresponding coordinating BS and the MS;
a transmitter that transmits to the MS, coordinately with the at least one coordinating BS, downlink signals precoded according to the downlink signal precoding information.

10. An aiding controlling device in a MS of a collaborative multiple-input multiple-output based telecommunication network for aiding controlling a serving BS and at least one coordinating BS to coordinately perform downlink data communication with the MS, said aiding controlling device comprising:
- a first receiver that receives a measurement instruction from the serving BS, wherein the measurement instruction comprises determining information for aiding in determining channel related information of each downlink channel between the serving BS and the MS, and between the at least one coordinating BS and the MS;
- a determiner that determines, based on the determining information, channel related information for each downlink channel between the serving BS and the MS and between the at least one coordinating BS and the MS;
- a generator that generates feedback information in response to the measurement instruction according to the determined channel related information of each downlink channel between the serving BS and the MS and between the at least one coordinating BS and the MS;
- a sender that sends the feedback information to the serving BS; and
- a second receiver that receives downlink signals precoded according to the downlink signal precoding information transmitted coordinately by the serving BS and the at least one coordinating BS.

* * * * *